(12) United States Patent
Weber et al.

(10) Patent No.: US 11,489,412 B2
(45) Date of Patent: Nov. 1, 2022

(54) METHOD FOR PRODUCING A COMPONENT

(71) Applicant: AUDI AG, Ingolstadt (DE)

(72) Inventors: Korbinian Weber, Ingolstadt (DE); Thomas Breuer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 115 days.

(21) Appl. No.: 16/793,148

(22) Filed: Feb. 18, 2020

(65) Prior Publication Data

US 2020/0313516 A1 Oct. 1, 2020

(30) Foreign Application Priority Data

Mar. 25, 2019 (DE) ...................... 10 2019 204 002.0

(51) Int. Cl.
*H02K 11/25* (2016.01)
*H02K 3/50* (2006.01)
*H02K 15/00* (2006.01)

(52) U.S. Cl.
CPC ............... *H02K 11/25* (2016.01); *H02K 3/50* (2013.01); *H02K 15/0062* (2013.01)

(58) Field of Classification Search
CPC ........ H02K 15/085; H02K 11/25; H02K 3/50; H02K 15/0062; H02K 3/12; H02K 3/48
See application file for complete search history.

(56) References Cited

U.S. PATENT DOCUMENTS

| 9,893,600 | B2* | 2/2018 | Yamada | H02K 3/14 |
| 10,965,196 | B2* | 3/2021 | Dunn | H02K 11/25 |
| 2009/0140614 | A1 | 6/2009 | Heim | |
| 2014/0191629 | A1* | 7/2014 | Takahashi | H02K 11/20 310/68 C |
| 2014/0204973 | A1 | 7/2014 | Kinoshita et al. | |
| 2015/0295477 | A1* | 10/2015 | Koizumi | H02K 3/48 310/68 C |

FOREIGN PATENT DOCUMENTS

| CN | 202651998 U | 1/2013 |
| CN | 104242522 A | 12/2014 |
| CN | 104682627 A | 6/2015 |
| CN | 106208541 A | 12/2016 |
| CN | 107615026 A | 1/2018 |
| DE | 698 23 266 T2 | 4/2005 |
| DE | 10 2009 040 684 A1 | 3/2010 |
| DE | 10 2013 208 200 A1 | 11/2014 |

(Continued)

OTHER PUBLICATIONS

JP-2013225959-A machine translation on Jun. 3, 2022.*

(Continued)

*Primary Examiner* — Leda T Pham
(74) *Attorney, Agent, or Firm* — Maier & Maier, PLLC (57) ABSTRACT

A method for producing a component for an electric machine from a laminated core, which includes multiple grooves and a central axis, and a plurality of wire elements. Each wire element includes two legs made of wire, which are or will be connected to one another via a bend made of wire. At least the legs of the wire elements are arranged in parallel to the axis in the grooves. A temperature sensor is fastened at a bend of at least one wire element.

13 Claims, 4 Drawing Sheets

(56) References Cited

FOREIGN PATENT DOCUMENTS

| DE | 102015222720 A1 | 5/2017 | | |
|---|---|---|---|---|
| DE | 10 2016 214 029 A1 | 2/2018 | | |
| DE | 10 2017 203 788 A1 | 9/2018 | | |
| DE | 10 2018 103 249 A1 | 6/2019 | | |
| EP | 0 993 099 A1 | 4/2000 | | |
| EP | 3 190 689 A1 | 7/2017 | | |
| JP | H04-317543 A | 11/1992 | | |
| JP | 2011-112563 A | 6/2011 | | |
| JP | 2013225959 A | 10/2013 | | |
| JP | 2013225959 A | * 10/2013 | ............ | H02K 11/25 |
| JP | 2016-214011 A | 12/2016 | | |

OTHER PUBLICATIONS

Examination Report dated Jan. 13, 2020 in corresponding German application No. 10 2019 204 002.0; 12 pages including Machine-generated English-language translation.

European Search Report dated Aug. 11, 2020, in connection with corresponding EP Application No. 20157092.6 (15 pp., including machine-generated English translation).

Office Action dated Jan. 24, 2022, in connection with corresponding Chinese Application No. 202010212064.3 (14 pp., including machine-generated English translation).

Extended European Search Report dated May 2, 2022, in connection with corresponding European Application No. 20157092.6 (21 pp., including machine-generated English translation).

Office Action dated Jul. 21, 2022 in corresponding Chinese Application No. 202010212064.3, 17 pages (including English translation).

* cited by examiner

METHOD FOR PRODUCING A COMPONENT

FIELD

The disclosure relates to a method for producing a component for an electric machine and a component for an electric machine.

BACKGROUND

A stator for an electric machine includes multiple coils, the temperature of which can be measured using a temperature measuring element.

An electric motor usable as the drive machine of a motor vehicle is known from the document DE 10 2016 214 029 A1.

The document DE 10 2013 208 200 A1 describes a method and a device for producing an electric machine.

An electric motor and a method for producing such an electric motor are described in the document DE 10 2017 203 788 A1.

SUMMARY

Against this background, it was an object to position a temperature sensor advantageously on a coil of an electric machine.

The method according to the disclosure is provided for the production of a component for an electric machine from a laminated core, which comprises multiple grooves and a central axis, and a plurality of, for example U-shaped wire elements, wherein each wire element comprises two legs made of wire, which are connected or become connected to one another via a bend made of wire. In this case, at least the legs of the wire elements are arranged in parallel to the axis in the grooves, wherein the bends are typically arranged axially offset outside the grooves. Furthermore, a temperature sensor is fastened at the bend or at a tip of the bend of at least one wire element.

At least one wire element is typically produced from a section of wire which is bent in the middle, for example, wherein the bend and the two legs are produced or formed by bending the one section made of wire.

Alternatively or additionally, at least one wire element can be produced from two sections made of wire or two partial wire elements, for example two individual legs, which are formed, for example, S-shaped or J-shaped depending on the definition, wherein these two wire elements are connected to one another, wherein the bend is formed or produced by connecting the two wire elements or sections made of wire. The two partial wire elements can be welded to one another in this case, wherein the partial wire elements are connected to one another in this case for example via a spot weld as at least one connecting element. It is possible to connect the two partial wire elements to one another after the legs thereof have been arranged in at least one groove or before the legs are arranged in the at least one groove.

In one design, the temperature sensor can be incorporated during a connection of the two wire elements to form the at least one or at least one wire element into the at least one or at least one wire element, for example, into the bend to be produced or produced in this case for connecting the partial wire elements made of wire. This is possible after the legs have been arranged in the at least one groove or before the legs are arranged in the at least one groove.

Accordingly, two measures can each be carried out for producing a wire element. Wire, which consists of a conductive metal, for example copper, is typically provided as piece goods. In this case, the wire can have a polygonal, in particular square, or a round cross section and can possibly be clad using insulating material. In both cases, sections which each have a provided length are cut off from the wire, for example, cut to length. In the first case, a section made of wire is bent in each case and thus a wire element is produced. In the second case, two individual partial wire elements, after they have been cut off from the piece goods made of wire, are each formed at one end, wherein a respective formed end forms a half bend of the wire element to be produced from the two sections. The two bent sections or partial wire elements are connected to one another, for example by welds, at the respective provided half bends.

In one embodiment, the legs of the at least one wire element are firstly arranged in the at least one groove, wherein the temperature sensor is then arranged and fastened at the bend of the at least one wire element. Alternatively thereto, the temperature sensor is firstly arranged and fastened at the bend of the at least one wire element, wherein the legs of the at least one wire element, at the bend of which the temperature sensor is fastened, are only arranged thereafter in the at least one groove. Independently of a respective provided sequence, the legs are typically oriented in the grooves at least essentially in parallel to the axis of the laminated core in the scope of typical manufacturing tolerances.

Moreover, the bends of the plurality of wire elements are arranged in multiple, for example ring-shaped layers in relation to the axis of the laminated core, wherein a bend from or in one layer in each case has a layer-dependent distance to the axis of the laminated core. A bend of the at least one wire element which is or will be provided and/or selected for fastening the temperature sensor will be or is arranged in a middle layer, which has a moderate or average distance to the axis of the laminated core in comparison to all bends of all wire elements. If firstly the legs of all wire elements are arranged in the grooves of the laminated core, subsequently at least one bend in the middle layer is selected, at which the temperature sensor is arranged. If alternatively the temperature sensor is arranged at the bend of the at least one wire element before the legs of all wire elements are arranged in the grooves, the bend of the at least one wire element at which the temperature sensor is already fastened is arranged, during the insertion or arrangement of the legs of all wire elements, in the middle layer provided for this purpose having the moderate distance to the axis.

If the bend of the at least one wire element is clad using insulating material or an insulation, it can be removed before the temperature sensor is fastened thereon.

In a further design, the at least one temperature sensor is arranged and/or fastened at a winding head or a bend side for the component of the electric machine.

Furthermore, open ends of the respective two legs of a wire element which are opposite to the bend are also arranged axially outside the grooves, wherein the bends of all wire elements are located on or at the bend side. This thus has the result that bends are arranged at a first axial opening of a respective groove outside this groove on the bend side and ends of legs of the wire elements are arranged at a second axial opening of a respective groove outside this groove, wherein these two openings are axially offset. Additionally, the open ends of the legs, for example of at least two legs of different wire elements, are formed at the second axial opening, for example, turned or twisted and welded to one another. Furthermore, a winding or coil is provided here from a plurality of wire elements, the open ends of the legs of which are connected to one another by welding.

The component according to the disclosure is designed for an electric machine and comprises a plurality of, for example U-shaped wire elements. In this case, the laminated core comprises multiple grooves and a central axis, wherein each wire element comprises two legs made of wire, which are connected or will be connected to one another via a bend made of wire. In this case, at least the legs of the wire elements are arranged in the grooves in parallel to the axis, wherein the bends are arranged axially offset outside the grooves, wherein a temperature sensor is fastened at the bend, for example a tip of the bend of at least one wire element.

The component is formed, for example, as a stator or alternatively as a rotor of the electric machine.

Furthermore, at least one wire element or at least one wire has a quadrilateral, for example rectangular or square cross section.

Using the method, a placement of a temperature sensor or a thermal sensor at a hairpin stator is possible. For this purpose, in one design a hairpin wire element or a special hairpin wire element having an extended attachment surface is introduced on the bend side in a position thermally attached directly at the winding head, for example, in a middle winding layer, as a position for the temperature sensor and as a measurement point for the temperature at the bend of the at least one wire element. A coil of the stator comprises a plurality of open wire elements, which are or will be connected to the coil, wherein they are each formed and/or designated as a hairpin or hairpin-shaped. The, for example, hairpin-shaped wire elements are produced and/or processed in a hairpin form wire winding method, wherein the coil is produced from the wire elements. Furthermore, the temperature sensor or thermal sensor or a thermocouple is positioned externally at the winding head. The at least one wire element is formed or shaped U-shaped, for example. In this case, the temperature sensor is arranged at a central attachment point at the bend of the at least one wire element. Alternatively or additionally, the temperature sensor is arranged at a spot weld, which connects two partial wire elements at the bend.

A stator produced in the design of the method for the electric machine is produced from multiple wire elements in hairpin construction and is provided for an electric machine designed as an automotive drive machine. In this manufacturing technology, a wire, which is, for example, rectangular in profile, is firstly bent into a U shape or hairpin shape. The legs of multiple such hairpin-shaped wire elements are subsequently arranged in a circle and inserted into the grooves of the laminated core of the stator to be produced. All open ends of the legs or all open pin ends or open ends of all wire elements on a rear side of the stator are twisted by a defined angle concentrically in relation to the axis of the stator to be produced or the laminated core in a next step. At the same time, all ends of wire elements which are located on one diameter or one layer and have the same distance to the central axis of the stator are alternately twisted clockwise and counterclockwise. This procedure or step is referred to as twisting. All pairs of ends of the legs of wire elements which come to rest after the twisting having the same distance to the axis in one layer, typically directly adjacent to one another, are thereupon welded to one another. Depending on the winding scheme, so-called interconnection bridges are placed on the winding head and welded to the ends of the wire elements to interconnect the hairpins to form a complete winding or a complete coil. In addition, it is optionally possible that the ends of the wire elements are insulated and the entire stator is impregnated.

This stator produced in this manner is used, for example, for an electric motor in the automotive field, wherein the described method can be automated to a high degree and/or is carried out automatically. In this case, a higher copper fill factor, which describes a ratio of a copper area, typically a copper area of all wire elements or the coil or winding, to a groove area of each groove is achieved in the respective groove of the stator.

In the method, in one embodiment, half hairpins or S-pins and thus half U-shaped or S-shaped or J-shaped partial wire elements can also be used for producing the stator. By using or employing partial wire elements formed in this manner, interconnection elements, for example phase terminals and/or a start point of the stator of a twisted and welded winding head, which comprises the welded ends of the wire elements, on a first side of the stator on a bent winding head, which comprises the bends of the wire elements in the at least one temperature sensor, are displaced to another second side of the stator.

Using the at least one temperature sensor integrated into the component in the scope of the method, a temperature of the winding or coil is monitored in operation of the component designed, for example as a stator.

In the prior art, it was typical to attach this temperature sensor, for example in the case of a shaped wire stator, typically at individual conductors or at interconnection elements such as the star point. Furthermore, a short shaped wire part was attached in a thermally conductive manner as a third conductor to a welded pin pair required for the interconnection and led out of the winding head.

The position provided in the scope of the method of the at least one temperature sensor at a bend of the wire element is decisive for a control of the electric machine. In one design of the method, placing the temperature sensor at an exposed point, for example on an outermost winding, entirely outside the winding head or at a larger heat sink, for example a star point connector, is avoided. In this case, a value of the temperature measured by a respective temperature sensor is prevented from being corrupted by cooling of the winding heads in comparison to the remainder of the winding.

The above-mentioned or stated requirements with respect to good thermal attachment of the sensor at the winding temperature in the prior art are impractically in opposition to good accessibility, immersibility, and/or installation capability of temperature sensors.

These production-side aspects for the fastening of a temperature sensor at an exposed point and at an interconnection element of the stator and a good thermal attachment of the temperature sensor at the winding temperature are provided by the method.

Using the method, a plurality of sensors can be equipped with temperature sensors in large-scale production. Good installation capability, accessibility, and immersibility are achieved in a placement of the temperature sensor at the same time.

In a first exemplary embodiment of the method, the wire element is produced from two partial wire elements, for example two S-shaped hairpins, which are connected to one another at a spot weld, wherein a bend is also produced which connects the two partial wire elements to one another. It is possible in this case that each partial wire element comprises a partial bend, wherein the wire element and also the bend of the wire element is only formed by connecting the two partial bends of the two partial wire elements. The legs of this wire element produced from two partial wire elements are then introduced or arranged in at least one groove of a laminated core. Subsequently, the temperature sensor is attached at the bend located outside the groove, close to the spot weld, wherein a possibly provided insulation on the partial wire elements and/or the wire element is removed during manufacturing in the region of the provided spot weld. The two partial wire elements can be connected via the spot weld before the two legs thereof have been arranged in the at least one groove or after the legs have been arranged in the at least one groove.

In a further embodiment of the method, it is possible that a complete bent wire element or a complete, for example U-shaped hairpin is already provided, wherein it is possible to additionally form, for example to erect a tip at the bend of this wire element which connects the two legs of the wire element and to subsequently attach, for example to fasten the temperature sensor at and/or on the possibly stripped tip of the wire element.

In all embodiments of the method, it is possible to attach, for example to fasten the temperature sensor directly at a surface which is axially attached to a winding head of the component to be produced. The at least one bend at which the temperature sensor is arranged on the bend side, is well accessible externally, whereby the temperature sensor can be installed well. This bend is a short but comparatively rigid and freely accessible element of the component to be produced, wherein it is possible that the temperature sensor is applied to the bend axially, tangentially, or radially in relation to the motor axis or the axis of the laminated core. In particular in the case of a component designed as a stator, in which, for example, bent wire elements or S-shaped partial wire elements are used, it is possible to arrange or house the at least one temperature sensor on the bend side of the wire elements, at which the bends of all wire elements are located, since it is possible on this bend side to lay and/or install a line or a cable for the temperature sensor together with further provided phase terminals. This bend side is better accessible than the site facing away axially from the bend side, at which ends of the legs of the wire elements are located, which are twisted and welded to produce the winding.

The at least one temperature sensor can be placed freely in the winding made of the plurality of wire elements at the bend of the at least one wire element, wherein this at least one wire element, at the bend of which the temperature sensor is fastened, otherwise behaves like a regular wire element. If the bend is initially still insulated, and insulation is removed or stripped and the temperature sensor is fastened on the bare or stripped bend, wherein the sensor and a possibly still bare section of the bend are nonetheless coated with an insulation. Moreover, it is possible to dispense with covers and masks during the insulation, in general during an immersion process, of the bare, i.e., stripped wire elements on a weld side.

During the arrangement of the legs of the wire elements in the grooves of the laminated core, many layers or plies are formed from bends, which each have a layer-dependent distance to the axis of the laminated core. In one embodiment of the method, one bend of the at least one wire element is selected which in comparison to the bends of the other wire elements is located in a middle row or a middle layer having a moderate distance to the axis, at which the temperature sensor is fastened. Furthermore, it is possible that the bends of the wire elements are exposed little to the outside, i.e., outside the grooves. Moreover, a temperature which is measured by the at least one temperature sensor at the bend of the at least one wire element deviates only slightly from the temperature of the remaining winding. The respective temperature sensor can be fastened directly on bare conductor material, for example copper, of the respective wire element, which is also possible, for example, if this wire element is produced from two stripped S-shaped partial wire elements. In this case, the temperature sensor is fastened at a welding point at the bend, which connects the partial wire elements or the legs of the wire element formed therefrom. In general, the temperature sensor can be thermally attached well at the winding. It is well possible in this case to set and/or monitor possible distances from a remainder of the winding, for example, in consideration of air gaps and creepage gaps.

By way of the arrangement of the temperature sensor provided in the scope of the method, the value of the temperature can be measured more accurately and is not strongly corrupted in comparison to other arrangements.

Further advantages and designs of the disclosure result from the description and the appended drawings.

It is obvious that the above-mentioned features and the features still to be explained hereafter are usable not only in the respective specified combination but rather also in other combinations or alone, without leaving the scope of the present disclosure.

BRIEF DESCRIPTION OF THE DRAWINGS

The disclosure is schematically illustrated in the drawings on the basis of specific embodiments and will be described schematically and comprehensively with reference to the drawings.

The figures are described coherently and comprehensively, the same reference signs are assigned to identical components.

DETAILED DESCRIPTION

Figure 1:
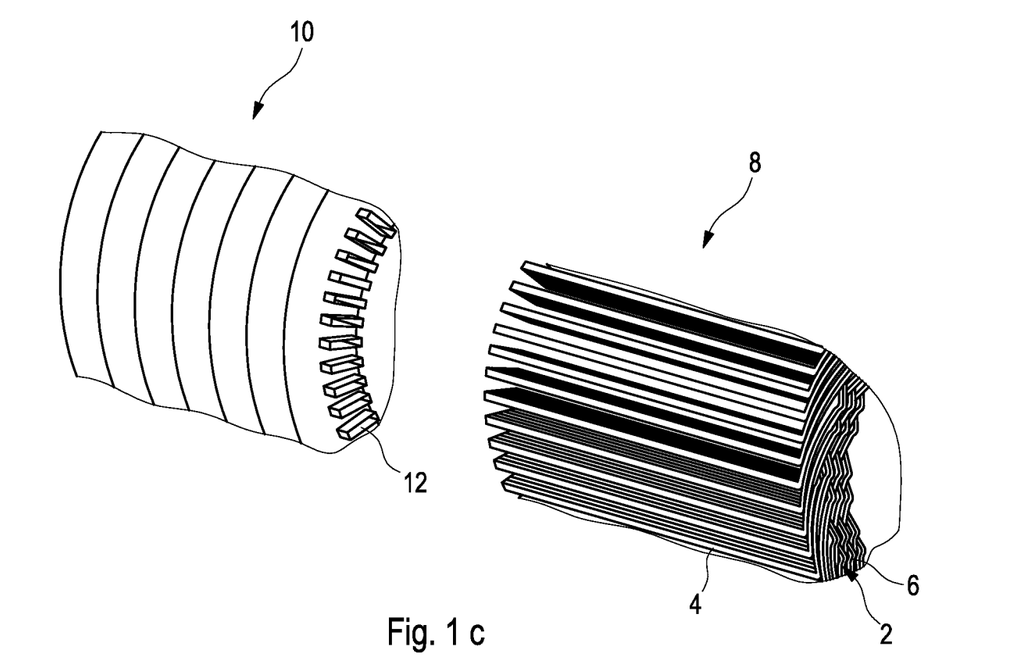
FIG. 1a shows, in a schematic illustration, steps for producing a first embodiment of the component according to the disclosure using a first example of a wire element when carrying out a first embodiment of the method according to the disclosure.
FIG. 1b shows, in a schematic illustration, steps for producing a first embodiment of the component according to the disclosure using a first example of a wire element when carrying out a first embodiment of the method according to the disclosure.
FIG. 1c shows, in a schematic illustration, steps for producing a first embodiment of the component according to the disclosure using a first example of a wire element when carrying out a first embodiment of the method according to the disclosure.
FIG. 1d shows, in a schematic illustration, steps for producing a first embodiment of the component according to the disclosure using a first example of a wire element when carrying out a first embodiment of the method according to the disclosure.

FIG. 1a shows the first example of a wire element 2, which is used in addition to a plurality of further wire elements 2, as shown, for example, in FIG. 1b, when carrying out the first embodiment of the method according to the disclosure for producing the first embodiment of the component 14 according to the disclosure, which is partially schematically shown in FIG. 1d. Each wire element 2 comprises two legs 4, which are connected to one another via a bend 6. In the embodiment provided here, a section made of wire is provided and bent to produce the wire element 2, wherein the bend 6 is formed, and wherein the two legs 4 are arranged substantially in parallel to one another in the scope of typical manufacturing tolerances. Furthermore, a basket 8 is produced from multiple such bent wire elements, which are for example U-shaped depending on the definition. In this case, a part of such a basket 8, while it is being assembled and up to this point only comprises a few wire elements 2, is shown in FIG. 1b. FIG. 1c, in contrast, shows a detail of a complete basket 8 having the provided complete number or plurality of wire elements 2. In this case, in the illustration in FIG. 1c, in contrast to the illustration of FIG. 1a, open ends of the legs 4 of the wire elements 2 are facing toward an observer, while in contrast the bends 6 are facing away from the observer. FIG. 1c furthermore shows a detail of a laminated core 10, which has a central axis here. In this case, the laminated core, which is substantially tubular or hollow cylindrical in the scope of typical manufacturing tolerances, comprises multiple axially oriented groups 12 on an inner wall here, wherein the legs 4 of the wire elements 2 are arranged in its grooves 12 axially in relation to the axis of the laminated core 10. It results in this case, as shown in FIG. 1d, that, on the one hand, all bends 6 and ends of all legs 4 are arranged outside the grooves 12. Independently of the first embodiment of the method presented here, it is furthermore provided that ends of second legs 4 of each two wire elements 2, which have the same distance to the axis of the laminated core 10 after insertion of the basket 8 into the laminated core 10, are twisted with one another and connected to one another by welding, wherein a coil or a winding of the embodiment to be produced of the component 14, designed here as a stator, is formed from the plurality of wire elements 2.

In the first embodiment of the method, a temperature sensor 16, which is designed during operation of the electric machine to measure the temperature of the coil of the component 14 formed from the wire elements 2, is fastened at a bend 6 of at least one wire element 2, which is located outside the grooves 12.

The second example of the wire element 20 is shown in FIG. 2a from above in a top view, in FIG. 2b from the front in a frontal view, and in FIG. 2c in a side view, schematically in each case. To produce this wire element 20, which is also referred to as a standard pin, a section is cut off and bent of a wire, for example a copper wire. Two legs 22 are formed in this case from the original wire, which are arranged substantially in parallel to one another in the scope of typical manufacturing tolerances and are connected to one another via a bend 24 also formed from the original wire. In the second embodiment of the method according to the disclosure, legs 22 of a plurality of such wire elements 20 are arranged in axial grooves of a laminated core, as schematically shown, for example, on the basis of FIG. 1. It is provided in this case that the bends 24 of the wire elements 20 are arranged outside the grooves of the laminated core. Furthermore, a temperature sensor 26 is arranged at the bend 24 of at least one of these wire elements 20.

Figure 3:
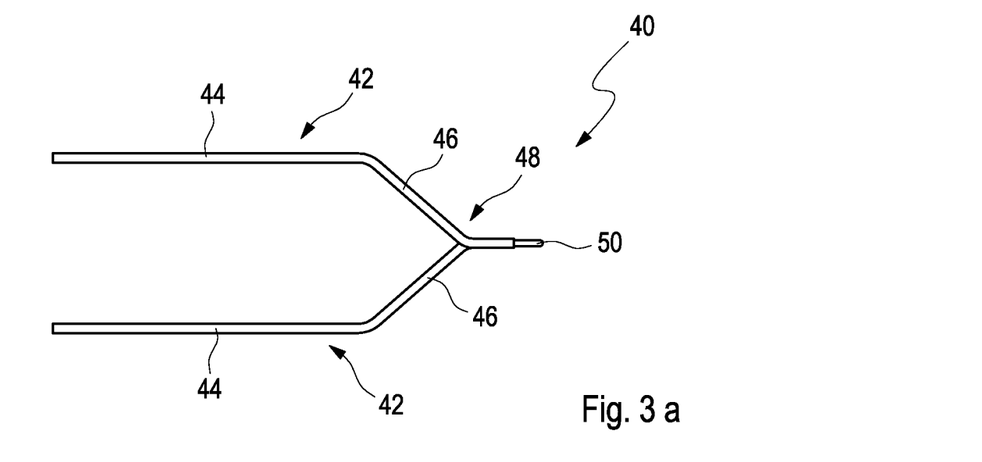
FIG. 3a shows details of a third example of a wire element when carrying out a third embodiment of the method according to the disclosure.
FIG. 3b shows details of a third example of a wire element when carrying out a third embodiment of the method according to the disclosure.
FIG. 3c shows details of a third example of a wire element when carrying out a third embodiment of the method according to the disclosure.

The third example of the wire element 40 is schematically shown on the basis of FIGS. 3a, 3b, 3c, wherein this third example of the wire element 40 is produced from two partial wire elements 42. In this case, each individual partial wire element 42 is formed from a section of wire, wherein this section of wire or the respective partial wire element 42 is bent, wherein the respective partial wire element 42 comprises a straight leg 44 and a half bend or partial bend 46, wherein each such partial wire element 42 is J-shaped or S-shaped depending on the definition. It is provided in this case that insulating material located at ends of the partial bends 46, which clads the respective partial bends 46 made of wire, is stripped. The stripped ends of the partial bends 46 of the two partial wire elements 42 are then connected to one another by welding, wherein overall a bend 48 is produced which connects the two partial wire elements 42 or the legs 44 thereof and depending on the definition also the partial bends 46 thereof, wherein this bend 48 comprises a tip 50, at which a temperature sensor 52 is arranged, which can furthermore be connected via a line 54 to a control device and/or measuring device. Stripped ends of the partial wire elements 42 welded to one another and the temperature sensor 52 fastened thereon can then be stripped using insulating material.

Figure 2:
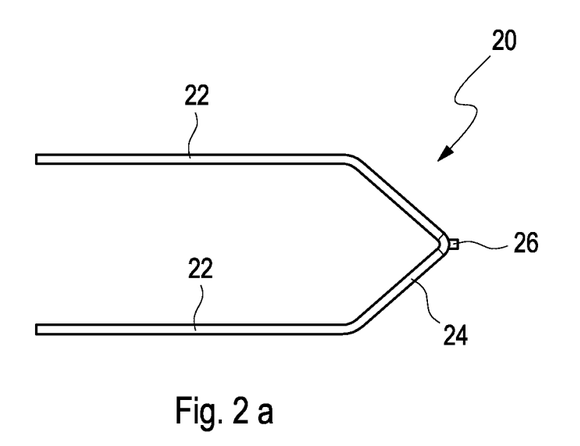
FIG. 2a shows details of a second example of a wire element which is used when carrying out a second embodiment of the method according to the disclosure.
FIG. 2b shows details of a second example of a wire element which is used when carrying out a second embodiment of the method according to the disclosure.
FIG. 2c shows details of a second example of a wire element which is used when carrying out a second embodiment of the method according to the disclosure.
Figure 4:
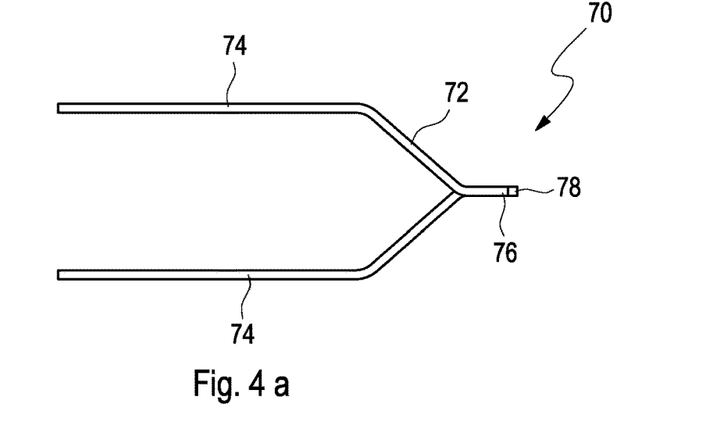
FIG. 4a shows, in a schematic illustration, details of a fourth example of a wire element for carrying out a fourth embodiment of the method according to the disclosure.
FIG. 4b shows, in a schematic illustration, details of a fourth example of a wire element for carrying out a fourth embodiment of the method according to the disclosure.
FIG. 4c shows, in a schematic illustration, details of a fourth example of a wire element for carrying out a fourth embodiment of the method according to the disclosure.

The fourth example of the wire element 70 for carrying out the fourth embodiment of the method according to the disclosure is shown from above in a top view in FIG. 4a, from the front in a frontal view in FIG. 4b, and from the side in a side view in FIG. 4c, schematically in each case. In this case, this wire element 70, similarly as in the case of the second example of the wire element 20 from FIG. 2, is produced from a section made of wire, wherein this section of the wire is also bent, wherein a bend 72 is also provided here, via which two legs 74 are or will be connected to one another, which are or will be substantially in parallel to one another in the scope of typical manufacturing tolerances. In this case, the bend 72 of the wire element 70 is additionally deformed, wherein a tip 76 for the bend or for the wire element is provided at one end of the bend 72. As soon as or after legs 74 of this wire element 70 and legs of further wire elements have been arranged in groups of a laminated core, a temperature sensor 78 is fastened at least at the tip 76 of this wire element, which remains or is arranged outside the grooves.

Figure 5:
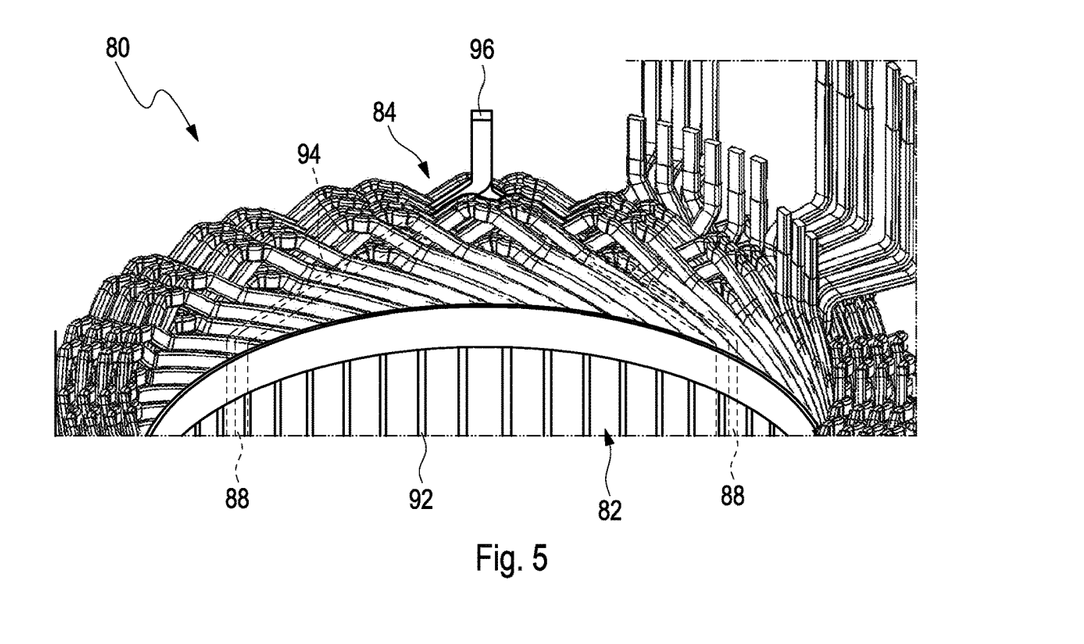
FIG. 5 shows, in a schematic illustration, details of an embodiment of the component according to the disclosure which has been produced by carrying out a fifth embodiment of the method according to the disclosure.

FIG. 5 shows a schematic illustration of the detail of the component 80 according to the disclosure for an electric machine, which has been produced by a fifth embodiment of the method according to the disclosure, which comprises a laminated core 82 and a plurality of wire elements 84, 86, wherein a reference numeral is only assigned to one wire element 84 here. The laminated core 82 comprises multiple grooves 92 and a central axis. Moreover, each wire element 84 comprises two legs 88 made of wire, which are connected to one another via a bend 94 made of wire. In this case, at least the legs 88 of the wire elements 84 are arranged in parallel to the axis in the grooves 92, wherein a temperature sensor 96 is fastened at the bend 94 of at least one wire element 84.

The invention claimed is:

1. A method for producing a component for an electric machine from a laminated core, comprising:
    inserting each of a plurality of wire elements into corresponding grooves provided in the laminated core;
    removing any insulation material present at a tip of at least one of the plurality of wire elements; and
    attaching a temperature sensor to the tip of the at least one of the plurality of wire elements,
    wherein each of the plurality of wire elements comprises two legs, which are connected to one another via a bend and which are arranged in parallel to a central axis of the laminated core inside the corresponding grooves, and
    wherein the tip is formed or erected at the bend so as to serve as an attachment point for the temperature sensor.

2. The method according to claim 1, wherein the at least one of the plurality of wire elements is produced from a section of wire which is bent to form the bend and the two legs.

3. The method according to claim 1, wherein the at least one of the plurality of wire elements is formed by connecting two partial wire elements which are joined at the tip to form the bend.

4. The method according to claim 3, wherein the temperature sensor is attached to the at least one of the plurality of wire elements during connection of the two partial wire elements.

5. The method according to claim 2, wherein the legs of the at least one of the plurality of wire elements are firstly arranged in at least one of the corresponding grooves, wherein and the temperature sensor is thereafter fastened at the tip of the at least one of the plurality of wire elements.

6. The method according to claim 1, wherein the bends of the plurality of wire elements are arranged in multiple layers in relative to the central axis of the laminated core,
    wherein each bend has a layer-dependent distance to the axis of the laminated core, and
    wherein the temperature sensor is arranged in a middle of the multiple layers.

7. The method according to claim 1, wherein the tip protrudes in an axial direction beyond adjacent wire elements.

8. A component for an electric machine, comprising:
    a laminated core,
    a plurality of wire elements, and
    a temperature sensor attached to a tip of at least one of the plurality of wire elements,
    wherein each of the plurality of wire elements are inserted into corresponding grooves provided in the laminated core,
    wherein each of the plurality of wire elements comprises two legs, which are connected to one another via a bend and which are arranged in parallel to a central axis of the laminated core inside the corresponding grooves,
    wherein the tip is formed or erected at the bend so as to serve as an attachment point for the temperature sensor, and
    wherein the tip is locally stripped of any insulation material provided on the plurality of wire elements.

9. The component according to claim 8, wherein the component is a stator.

10. The component according to claim 8, wherein the at least one of the plurality of wire elements has a quadrilateral cross section.

11. The method according to claim 1, wherein the plurality of wire elements are each clad in the insulation material.

12. The component according to claim 8, wherein the tip protrudes in an axial direction beyond adjacent wire elements.

13. The component according to claim 8, wherein the plurality of wire elements are each clad in the insulation material.

\* \* \* \* \*